United States Patent
Kang et al.

(10) Patent No.: US 9,772,427 B2
(45) Date of Patent: Sep. 26, 2017

(54) MULTIPLE-POWER MULTIPLE-DOSAGE ACCELERATORS, RAPID EXAMINATION SYSTEMS AND RAPID EXAMINATION METHODS THEREOF

(71) Applicants: Tsinghua University, Haidian District, Beijing (CN); Nuctech Company Limited, Haidian District, Beijing (CN)

(72) Inventors: Kejun Kang, Beijing (CN); Jianmin Li, Beijing (CN); Ying Li, Beijing (CN); Yuanjing Li, Beijing (CN); Wei Yin, Beijing (CN); Juan Zheng, Beijing (CN); Lei Zeng, Beijing (CN)

(73) Assignees: Tsinghua University, Haidian District, Beijing (CN); Nuctech Company Limited, Haidian District, Beijing (CN)

( * ) Notice: Subject to any disclaimer, the term of this patent is extended or adjusted under 35 U.S.C. 154(b) by 45 days.

(21) Appl. No.: 14/892,640

(22) PCT Filed: Jan. 17, 2014

(86) PCT No.: PCT/CN2014/000063
§ 371 (c)(1),
(2) Date: Nov. 20, 2015

(87) PCT Pub. No.: WO2014/117636
PCT Pub. Date: Aug. 7, 2014

(65) Prior Publication Data
US 2016/0103241 A1    Apr. 14, 2016

(30) Foreign Application Priority Data

Nov. 14, 2013   (CN) .......................... 2013 1 0564187

(51) Int. Cl.
*G01V 5/00*          (2006.01)

(52) U.S. Cl.
CPC .......... *G01V 5/0041* (2013.01); *G01V 5/0025* (2013.01)

(58) Field of Classification Search
CPC .. G01V 5/0016; G01V 5/0066; G01V 5/0041; G01V 5/0008; G01N 23/04; G01N 2223/639; G01N 2223/643
See application file for complete search history.

(56) References Cited

U.S. PATENT DOCUMENTS 7,082,186 B2   7/2006   Zhao et al.
7,492,861 B2   2/2009   Chen et al.
(Continued)

FOREIGN PATENT DOCUMENTS

AU   2012254975 A1   12/2012
CN      1995993 A     7/2007
(Continued)

OTHER PUBLICATIONS

Extended European Search Report for corresponding European Patent Application No. 14746344.2 mailed Nov. 2016, 11 pgs.
(Continued)

*Primary Examiner* — Hoon Song
(74) *Attorney, Agent, or Firm* — Merchant & Gould P.C.

(57) ABSTRACT

The disclosure provides a multi-power multi-dosage accelerator. The multi-power multi-dosage accelerator comprises an electron gun configured to provide a first voltage of the electron gun and a second voltage of the electron gun, and an accelerating tube configured to generate a first X-ray having a first dosage and first power according to the first voltage of the electron gun and generate a second X-ray having a second dosage and second power according to the second voltage of the electron gun, wherein the first dosage is a dosage which can be accepted by human bodies and is much less than the second dosage, the first X-ray is used for
(Continued)

inspecting a first area where a person is located, and the second X-ray is used for inspecting a second area where goods are located.

12 Claims, 5 Drawing Sheets

(56) References Cited

U.S. PATENT DOCUMENTS

| | | |
|---|---|---|
| 2005/0078794 A1 | 4/2005 | Leek |
| 2007/0269013 A1 | 11/2007 | Liu et al. |
| 2010/0127169 A1 | 5/2010 | Whittum et al. |
| 2010/0188027 A1 | 7/2010 | Treas et al. |
| 2010/0219776 A1 | 9/2010 | Liu et al. |
| 2011/0176660 A1* | 7/2011 | Morton ............... G01V 5/0066 378/57 |
| 2012/0294422 A1 | 11/2012 | Cheung et al. |
| 2013/0039462 A1* | 2/2013 | Morton ............... G01V 5/0041 378/57 |

FOREIGN PATENT DOCUMENTS

| | | |
|---|---|---|
| CN | 101076218 A | 11/2007 |
| RU | 2383883 C2 | 3/2010 |
| RU | 2390007 C2 | 5/2010 |
| RU | 2396512 C2 | 8/2010 |
| RU | 2430424 C1 | 9/2011 |
| WO | 2012106730 A2 | 8/2012 |
| WO | 2013117694 A2 | 8/2013 |

OTHER PUBLICATIONS

Russian Search Report for corresponding Russian Patent Application No. 2015151865/28(079848) mailed Apr. 19, 2016, 2 pgs.
International Search Report for International Patent Application No. PCT/CN2014/000063 mailed Aug. 29, 2014.

\* cited by examiner

MULTIPLE-POWER MULTIPLE-DOSAGE ACCELERATORS, RAPID EXAMINATION SYSTEMS AND RAPID EXAMINATION METHODS THEREOF

This application is a National Stage Application of PCT/CN2014/000063, filed 17 Jan. 2014, which claims benefit of Serial No. 201310564187.3, filed 14 Nov. 2013 in China and which applications are incorporated herein by reference. A claim of priority is made to each of the above disclosed applications.

TECHNICAL FIELD

The present disclosure relates to a multi-power multi-dosage accelerator, and more particularly, to a multi-power multi-dosage accelerator used when different areas of an object are imaged. Further, the present disclosure further relates to a fast inspection system including such accelerator and a corresponding fast inspection method using the fast inspection system.

BACKGROUND

In the field of X-ray security inspection, an X-ray vehicle inspection system is comprised of an X-ray imaging sub-system, a scanning control sub-system, an operation inspection sub-system, and a radiation security sub-system. The X-ray imaging sub-system is the core of the whole system, and is comprised of a ray source, a detector, and a data acquisition and control module, to generate X-ray transmitted and/or scattered images. When a container/vehicle to be inspected is scanned, a high-power X-ray pulse is generated by the ray source, is transmitted through goods to be inspected, and is received and converted into an output signal by a high-sensitivity array of detectors. Finally, a series of digital image signals are generated in real time by the data acquisition and control module. When the whole scanning process is completed, a complete image of the vehicle to be inspected is generated automatically by the system.

Figure 1:
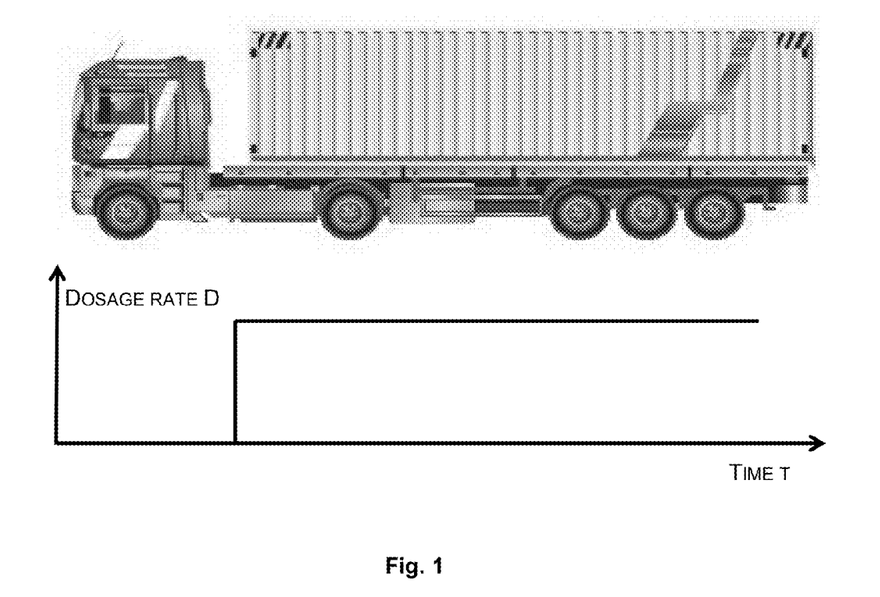
FIG. 1 illustrates a chart of a dosage rate in a head avoidance solution.
Figure 2:
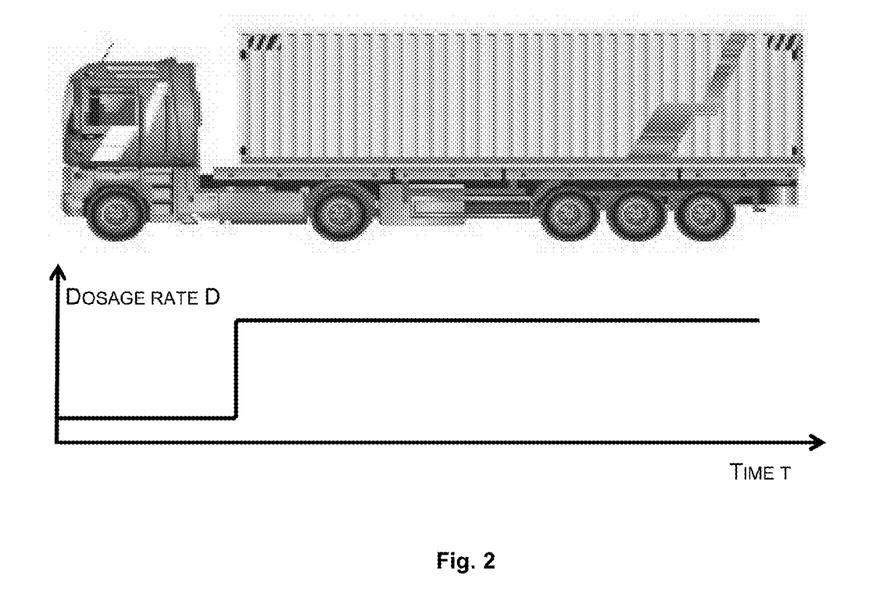
FIG. 2 illustrates a chart of a dosage rate in a solution of scanning a head at a low dosage rate.

In a conventional fast inspection system for a container/vehicle, the container is scanned and imaged by using an accelerator as a ray source. In the field of X-ray security inspection, it should be noted that it is beneficial if a driver drives to enable the goods to pass through the static X-ray inspection system. In order to ensure the penetrating power and image quality, the X-ray output by the accelerator has a high dosage rate. However, in most commercial operating environments, when imaging is performed by using a high-dosage X-ray source, a ray dosage accumulated on the driver in the scanning process will reach an unacceptable level. Therefore, as shown in FIG. 1, in order to ensure radiation security of the driver, it needs to avoid scanning the cab. However, a scanned image of the cab and the driver cannot be obtained, and thus there may be a certain security risk. In order to enable the fast inspection system for a container/vehicle to obtain the whole scanned image including the cab, a feasible solution is illustrated in FIG. 2, in which the vehicle head is scanned by using a low-dosage ray, to obtain a scanned image in the premise of ensuring personal security. The compartment is scanned by using a normal-dosage ray.

Figure 3:
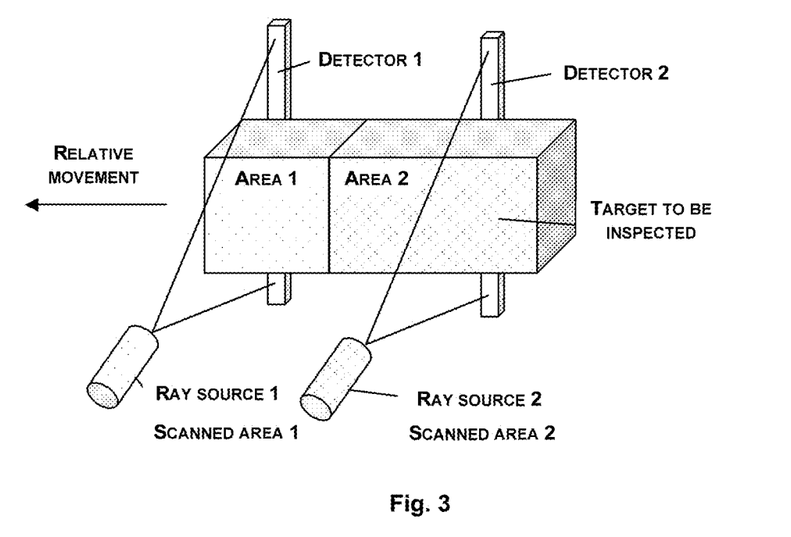
FIG. 3 is a schematic diagram of scanning two areas of a object to be inspected respectively using two ray sources.

With respect to the feasible solution illustrated in FIG. 2, there are multiple possible implementations currently. One implementation is that two imaging apparatuses are used as shown in FIG. 3, in which two ray sources (a first ray source and a second ray source) are used to scan the head of the vehicle using a low-dosage ray output by a low-dosage X-ray tube and scan the compartment using a high-dosage ray output by an accelerator. In this implementation, the system structure is complex and the cost is high due to the use of two imaging apparatuses. At the same time, the low-power X-ray tube generated by the low-power X-ray has a poor penetrating power and a non-ideal imaging effect.

Figure 4A:
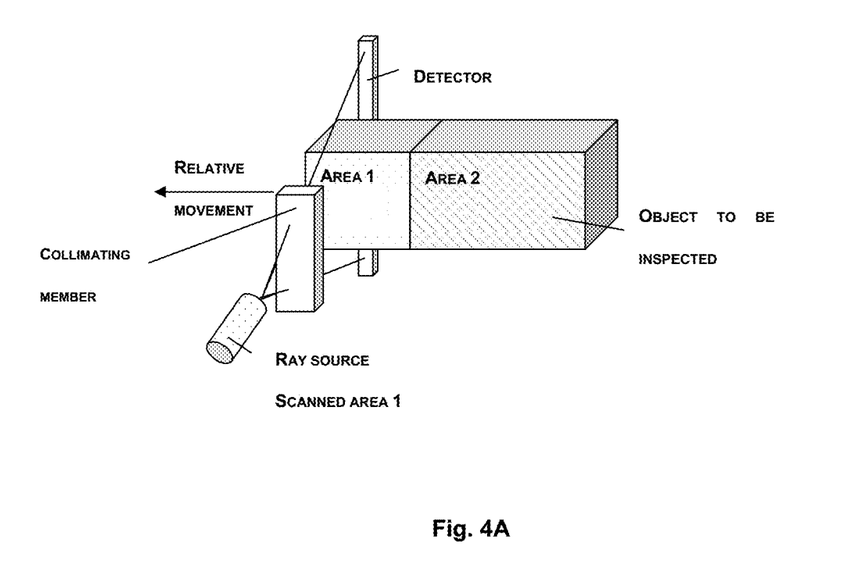
FIGS. 4A and 4B are schematic diagrams of scanning the whole area of a object to be inspected using one ray source in the prior art.
Figure 4B:
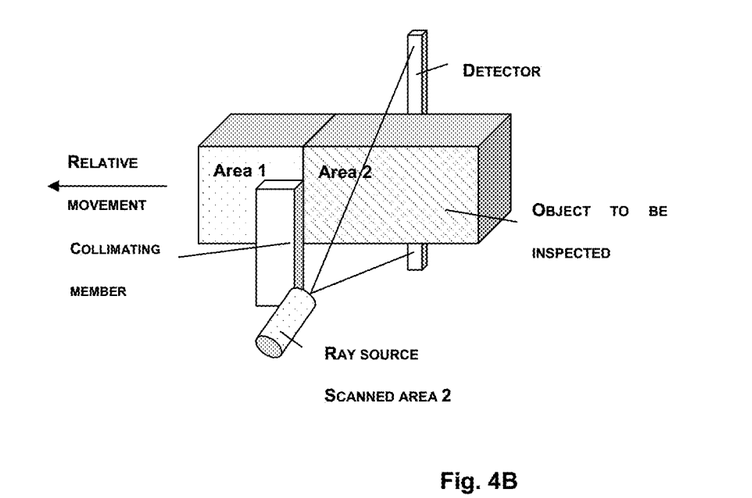

Another possible solution of scanning a cab using a low-dosage ray (FIGS. 4A and 4B) is to use an accelerator as a ray source. The accelerator outputs a stable high-dosage ray, and when the cab passes (as shown in FIG. 4A), the ray is blocked by a particular collimating member, to reduce the dosage rate of the X-ray illuminated on the cab, thereby meeting requirements on personal security. When the goods pass (as shown in FIG. 4B), the ray is not blocked by the particular collimating member, to illuminate the goods using a high-dosage ray. Such solution needs a particular mechanical collimating member, which is difficult to control and has a risk of a mechanical fault.

SUMMARY

On basis of this, the present disclosure proposes a solution of scanning a head of a vehicle using a low-dosage X-ray, which is different from the two solutions as described above. In this solution, the head and the compartment are scanned using a single accelerator. In addition to standard dosage output from the accelerator, a low-dosage X-ray output level is added to the accelerator. In this way, multiple dosages X-ray may be output in a single scanning process. The solution has advantages of a simple structure, low cost, high reliability etc. without using a particular mechanical collimating member to block the ray.

For this purpose, the present disclosure provides a multi-power multi-dosage accelerator, comprising: an electron gun configured to provide a first voltage of the electron gun and a second voltage of the electron gun; and an accelerating tube configured to generate a first X-ray having a first dosage and first power according to the first voltage of the electron gun and generate a second X-ray having a second dosage and second power according to the second voltage of the electron gun, wherein the first dosage is a dosage which can be accepted by human bodies and is much less than the second dosage, the first X-ray is used for inspecting a first area where a person is located, and the second X-ray is used for inspecting a second area where goods are located.

In the present disclosure, the electron gun is further configured to provide a third voltage of the electron gun, and the accelerating tube is configured to generate a third X-ray having a third dosage and third power according to the third voltage of the electron gun, wherein the first dosage is much less than the third dosage and the second power is different from the third power, and the second X-ray and the third X-ray are alternatively used for inspecting the second area where the goods are located.

In an embodiment of the present disclosure, the first voltage of the electron gun is lower than the second voltage of the electron gun and the third voltage of the electron gun, and the first power is higher than the second power and the third power.

In another embodiment of the present disclosure, the first voltage of the electron gun is higher than the second voltage of the electron gun and the third voltage of the electron gun, and the first power is lower than the second power and the third power.

In an embodiment of the present disclosure, the accelerating tube is a standing wave accelerating tube.

In another aspect of the present disclosure, a method for inspecting different areas using a multi-power multi-dosage accelerator comprising an electron gun and an accelerating tube is provided, the method comprising: providing, by the electron gun, a first voltage of the electron gun and a second voltage of the electron gun; generating, by the accelerating tube, a first X-ray having a first dosage and first power according to the first voltage of the electron gun, and generating a second X-ray having a second dosage and second power according to the second voltage of the electron gun, wherein the first dosage is a dosage which can be accepted by human bodies and is much less than the second dosage; inspecting a first area where a person is located using the first X-ray, and inspecting a second area where goods are located using the second X-ray.

In a further aspect of the present disclosure, a ray detection system is provided, comprising: a multi-power multi-dosage accelerator, including: an electron gun configured to provide a first voltage of the electron gun and a second voltage of the electron gun, and an accelerating tube configured to generate a first X-ray having a first dosage and first power according to the first voltage of the electron gun and generate a second X-ray having a second dosage and second power according to the second voltage of the electron gun, wherein the first dosage is a dosage which can be accepted by human bodies and is much less than the second dosage, the first X-ray is used for inspecting a first area where a person is located, and the second X-ray is used for inspecting a second area where goods are located; a detector configured to receive an X-ray emitted from the accelerator and transmitted through or scattered by a object to be inspected and convert the X-ray into an output signal; and a data acquisition and imaging module configured to receive the output signal from the detector, obtain partial scanned images of the first area and the second area of the object according to the output signal, and combine the obtained partial scanned images into a complete scanned image of the object.

With the accelerator, the fast inspection system including such accelerator and the fast inspection method using the accelerator, requirements for different areas of the object to be inspected are met in a single scanning process, to achieve measurements of multiple areas of the object without increasing cost.

BRIEF DESCRIPTION OF THE DRAWINGS

For more fully understanding the present disclosure, the description that follows will be described in combination with accompanying drawings, in which.

DETAILED DESCRIPTION

To make the purpose, technical solutions, and advantages of the present disclosure more clear and obvious, the technical solutions of the present disclosure will be further described below with reference to the accompanying drawings and embodiments.

Figure 5:
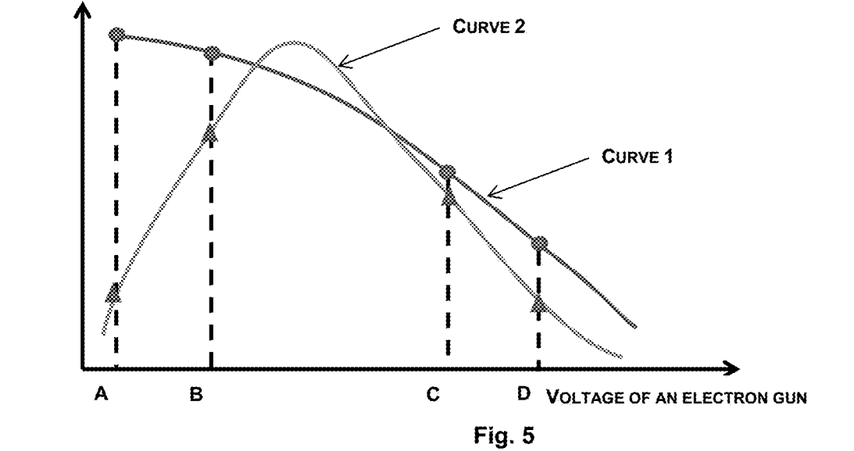
FIG. 5 is a schematic diagram illustrating a relationship among a voltage of an electron gun in an accelerator, power and a dosage of an X-ray output by an accelerating tube.

FIG. 5 is a schematic diagram illustrating a relationship among a voltage of an electron gun in an accelerator, power and a dosage of an X-ray output by an accelerating tube. The electron gun is generally comprised of a thermionic cathode, a control electrode and a number of accelerating anodes etc. The electron gun is an electron injector, and emits and injects an electron beam having specific power, specific intensity, a diameter, and an angle of emission (a direction and intensity of the electron beam are controllable) into an accelerating tube. The accelerating tube is a key component of the accelerator, which enables the electrons injected by the electron gun to be accelerated in a microwave electrical field to achieve high power, and finally generates a high-power X-ray by hitting a target. A structure of a standing wave accelerating tube plays an important role in a standing wave electron linear accelerator, and is the core of the standing wave accelerator. The performance of the complete machine is largely depends on the performance of the structure of the standing wave accelerating tube. The electrons are accelerated in a standing wave manner in the accelerating tube. The standing wave accelerating structure has a high shunt Impedance, and can excite high accelerating intensity with given microwave power, which is beneficial for miniaturization of the accelerator.

In a condition that the power of the injected microwave pulse is constant, the power and dosage of the X-ray output by the accelerating tube conforms to the following rule of curve. The blue curve (the first curve) represents a relationship between the power of the ray and the voltage of the electron gun, and the green curve (the second curve) represents a relationship between the dosage of the ray and the voltage of the electron gun. That is, with the increase of the voltage of the electron gun, the dosage of the X-ray output by the accelerator firstly increases and then decreases, and the power decreases. The accelerating tube is not limited to the type of standing wave accelerating tube, and it may be a travelling wave accelerating tube etc.

Figure 6:
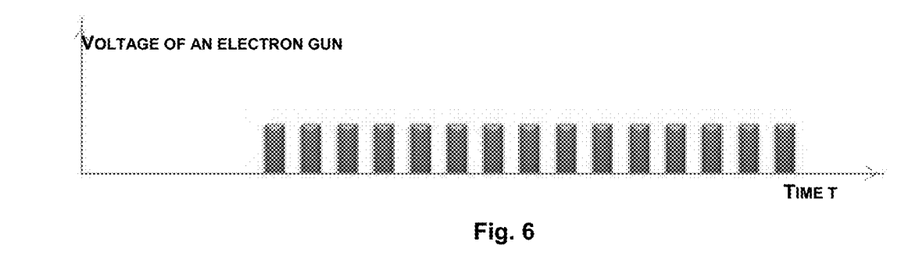
FIG. 6 illustrates a voltage of a power source of an electron gun when a compartment is inspected using a single-power X-ray.
Figure 7:
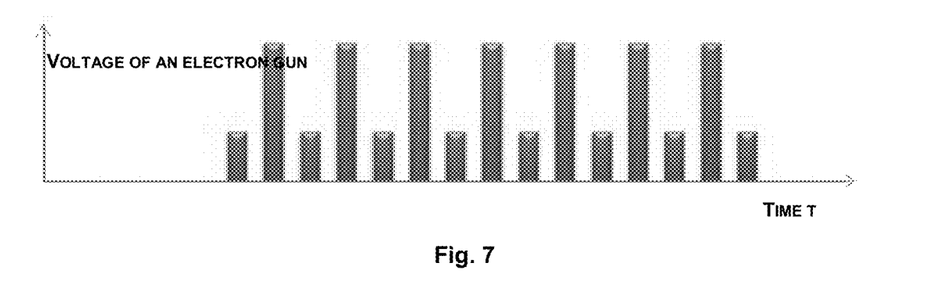
FIG. 7 illustrates an alternative voltage of a power source of an electron gun when a compartment is inspected using a dual-power X-ray.

In a conventional fast inspection system for a container/vehicle, a single-power electron accelerating system or a dual-power or multi-power electron accelerating system may be used. In a case that the single-power accelerator illustrated in FIGS. 4A and 4B is used, the accelerator operates at a B or C voltage level, as long as the power of the X-ray output by the accelerating tube can meet the power required for inspecting the goods. FIG. 6 illustrates a voltage of a power source of an electron gun when a compartment is inspected using a single-power X-ray. According to the relationship between the power and the dosage illustrated in FIG. 5, a normal dosage is output by the accelerating tube. When a dual-power X-ray is output, the accelerator is alternatively switched between the B level and the C level. FIG. 7 illustrates an alternative voltage of a power source of an electron gun when a compartment is inspected using a dual-power X-ray. According to the relationship between the power and the dosage illustrated in FIG. 5, (alternative) normal dosages are output by the accelerating tube. The dual-power or multi-power electron accelerating system is an electron accelerating system in which electron beams with two or more power can be generated by a single apparatus. Compared with the conventional single-power electron accelerating system, the dual-power electron accelerating system not only can provide diversified power by using a single apparatus, but also can identify different material of matters in combination with a new type of detector system, a data and image processing system etc. In the conventional fields such as industrial non-destructive inspection, customs container inspection, CT etc., the single-power accelerating system can only be used to identify a shape of a matter, and in contrast, the dual-power accelerating system can be used to identify both the shape and the material of the matter.

Figure 8:
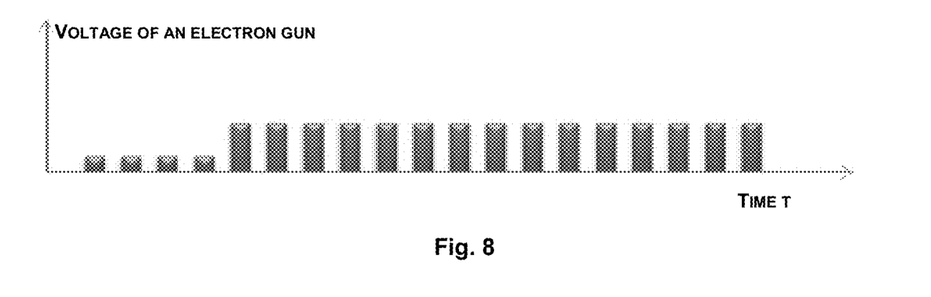
FIG. 8 illustrates a voltage of a power source of an electron gun when a cab is scanned using a low-dosage X-ray and a compartment is inspected using a single-power X-ray according to the present disclosure.
Figure 9:
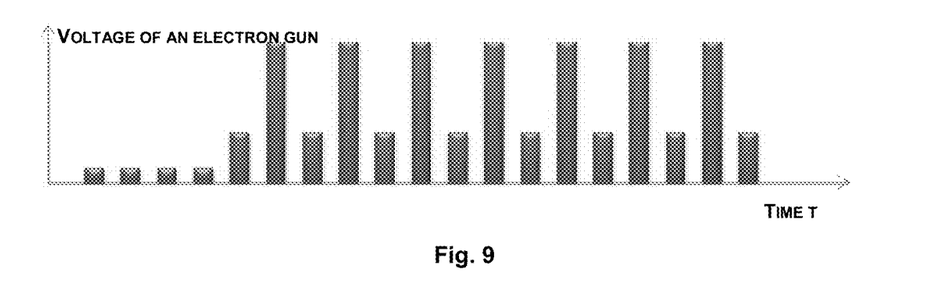
FIG. 9 illustrates a voltage of a power source of an electron gun when a cab is scanned using a low-dosage X-ray and a compartment is inspected using a dual-power X-ray according to the present disclosure.

In order to enable scanning the cab with a low-dosage X-ray, in addition to the B and C levels, an additional level A may be added, which may be achieved by reducing a voltage of the electron gun or increasing the voltage of the electron gun. In practical applications, as it is easier to achieve a low voltage of the electron gun than a high voltage of the electron gun, an ultra low voltage level A is preferably added in the power source of the electron gun. A low-dosage X-ray may be output at this voltage level. Thus, in a single scanning process, the voltage of the electron gun of the accelerator may be switched among three levels of A, B, and C. In a case that the goods are scanned with a single-power X-ray, when the head is scanned, the voltage of the electron gun of the accelerator is switched to the A level, and when the compartment is scanned, the voltage of the accelerator is switched to the B level or the C level. In this case, as shown in FIG. 8, when the head is scanned, an ultra low dosage and normal power corresponding to the A level are output by the accelerating tube, and when the compartment is scanned, a normal dosage corresponding to the B level or the C level and power corresponding to the B level or the C level are output by the accelerating tube. In a case that the goods are scanned with a dual-power X-ray, when the head is scanned, the voltage of the electron gun of the accelerator is switched to the A level, and when the compartment is scanned, the voltage of the accelerator is alternatively switched to the B level and the C level. In this case, as shown in FIG. 9, when the head is scanned, an ultra low dosage and normal power corresponding to the A level is output by the accelerating tube, and when the compartment is scanned, (alternative) normal dosages corresponding to the alternative B level and C level and alternative power corresponding to the alternative B level and C level are output by the accelerating tube.

In an alternative embodiment, as described above, a high voltage level D may be added in the power source of the electron gun. A low-dosage X-ray may be output at this voltage level, and at the same time, the power of the output X-ray meets the requirements on the inspection of the goods. Thus, in a single scanning process, the voltage of the electron gun of the accelerator may be switched among three levels of B, C and D, wherein the dosage corresponding to the D level may be the same as that corresponding to the A level. Similarly to switching among three levels of A, B, and C as described above, the voltage may be switched among three levels of B, C and D in a case that scanning is performed using a single-power X-ray and in a case that scanning is performed using a multi-power X-ray.

In an embodiment, power of the X-ray corresponding to four levels of A, B, C, and D may respectively be 6.5 MeV, 6 MeV, 3 MeV and 1 MeV. In another embodiment, the power of the X-ray corresponding to four levels of A, B, C, and D may respectively be 9.5 MeV, 9 MeV, 6 MeV, and 2 MeV. In a further embodiment, the power of the X-ray corresponding to four levels of A, B, C, and D may respectively belong to ranges of (6.1, 9.5) MeV, (6, 9) MeV, (3, 6) MeV, and (1, 2.9) MeV, and at the same time, the power of the X-ray corresponding to the A level is larger than that corresponding to the B level, the power of the X-ray corresponding to the B level is larger than that corresponding to the C level, and the power of the X-ray corresponding to the C level is larger than that corresponding to the D level. At the same time, irrespective of the above three embodiments or other specific implementations, the dosages of the X-rays at the A level and the D level should meet the following condition: when a driver drives through the system, the dosage adsorbed once by the driver should not be larger than 0.25 µSv (as specified according to the newest ANSI/HPS N43.17-2009 standard from the American National Standards Institute/health care physical society, devices for which the inspection radiation dosage once is 0.25 µSv or below belong to the range of general public security inspection devices).

Figure 10A:
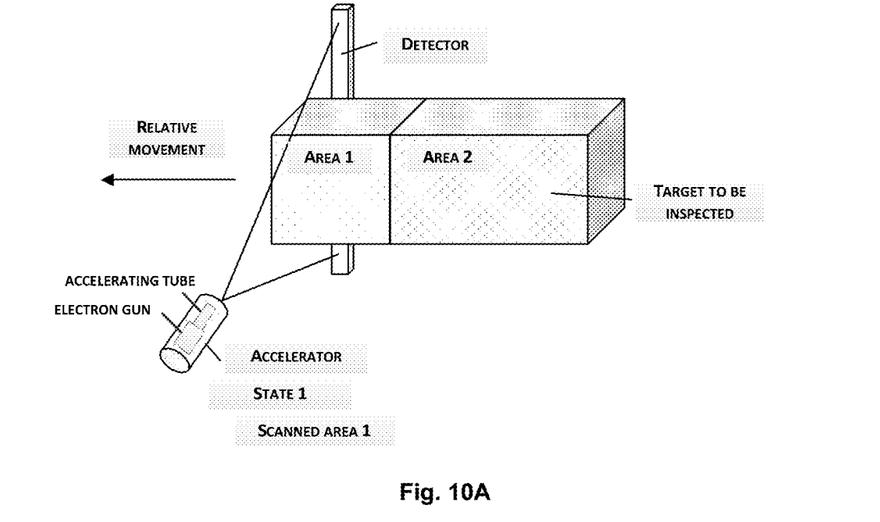
FIG. 10A is a schematic diagram of scanning one of two areas where a ray-sensitive object is located using an accelerator according to the present disclosure as a unified ray source.

In an implementation of the present disclosure, an object is inspected by using the accelerator according to the present disclosure as a ray source. In a single scanning process, the ray source may be switched between two or more operating states, which enable a variation in the power or dosage rate of the ray output by the ray source per se. In each operating state, scanned images of partial areas of the object may be obtained by an imaging device including a ray source and a detector. For example, a scanned image of an area where a person or another sensitive object is located is obtained at a low-dosage rate, and a scanned image of an area where the goods are located is obtained at a high-dosage rate. These images commonly form a scanned image of the whole object. In a single scanning process, the imaging device moves with respect to the object to be inspected. When the area where the person or another sensitive object is located is reached as shown in FIG. 10A, the imaging device is switched to a low-dosage rate state for scanning (as shown in the left sides of FIGS. 8 and 9). When another area (for example, the area where the goods are located) is reached as shown in FIG. 10B, the imaging device is switched to a high-dosage rate state in a short time for scanning (as shown in the right sides of FIGS. 8 and 9).

FIG. 10A is a schematic diagram of scanning a first of two areas where a ray-sensitive object is located using an accelerator according to the present disclosure as a unified ray source. An object to be inspected is scanned by using a unified ray source in FIG. 10A. When the first area (such as a cab) where a person or another sensitive object is located is reached, an imaging device including a ray source and a detector is switched to a low-dosage rate state for scanning.

In the embodiment with reference to FIG. 5, the ray source operates at an A level or a D level. The ray source outputs high power and a low dosage at the A level, or the ray source outputs low power and a low dosage at the D level. In the process of scanning the first area, the imaging device moves with respect to the object to be inspected from one side of the first area of the object to be inspected to the other side. The ray output from the ray source is transmitted through or scattered by the object to be inspected to the detector, to scan and image the first area of the object to be inspected. At this time, the object to be inspected is scanned and imaged by the imaging device in a low-dosage rate state. The dosage rate of the ray received by the object to be inspected is low in the low-dosage rate state, to ensure security of the person or the sensitive object.

Figure 10B:
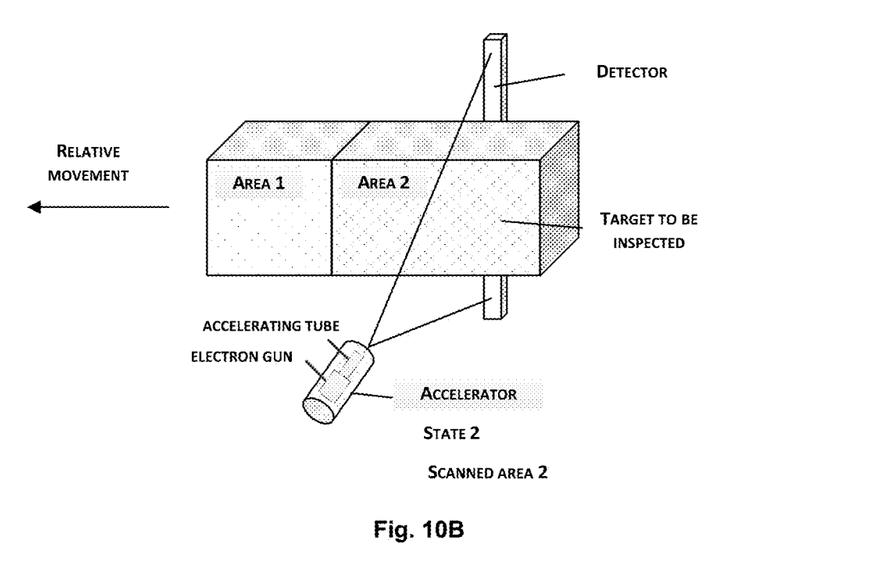
FIG. 10B is a schematic diagram of scanning one of two areas where a ray-insensitive object is located using an accelerator according to the present disclosure as a unified ray source.

FIG. 10B is a schematic diagram of scanning a second of two areas where a ray-insensitive object is located using an accelerator according to the present disclosure as a unified ray source. An object to be inspected is scanned by using a unified ray source in FIG. 10B. When the second area (such as an area where goods are located) where the object to be inspected (such as a truck) is located is reached, the system is switched to a high-dosage rate state in a short time for scanning. In the embodiment with reference to FIG. 5, the ray source may operate at a B level or C level in a single-power state, or may operate alternatively at the B level and the C level in a dual-power state. In the single-power state, the ray source outputs high power and a high dosage. In the dual-power state, the accelerator outputs alternative power and alternative dosages. The alternative power is smaller than the power output from the ray source at the A level and is larger than the power output from the ray source at the D level, and the alternative dosages are larger than the dosage output from the accelerator at the A level or the D level. In the process of scanning the second area, the imaging device including the ray source and the detector continues to move with respect to the object to be inspected from one side of the second area of the object to be inspected to the other side. The ray output from the ray source is transmitted through or scattered by the object to be inspected to the detector, to scan and image the second area of the object to be inspected. At this time, the object to be inspected is scanned and imaged by the imaging device in a high-dosage rate state. The dosage rate of the ray received by the object to be inspected is high in the high-dosage rate state, to ensure resolution of the scanned images.

As different areas of the same object are scanned and imaged by using a ray source operating in different scanning states in a single scanning process, the object to be inspected can be scanned exhaustively. Further, security of a sensitive area and high resolution imaging of an insensitive area can be achieved, to better meet requirements on inspection. The implementation of scanning and imaging of different areas of the object to be inspected in a single scanning process also improves operating efficiency of the system.

The imaging device in FIGS. 10A and 10B may further comprise a data acquisition and imaging module (not shown), which receives an output signal from a detector, obtains, according to the output signal, partial scanned images of various areas of the object in respective operating states of the ray source, and combines the obtained partial scanned images into a complete scanned image of the object.

The above description is merely specific embodiments of the present disclosure. The present is not limited thereto. Those skilled in the art can make various changes and variations to the present disclosure without departing from the spirit and scope of the present disclosure. Obviously, these changes and variations should belong to the protection scope of the present disclosure.

We claim:

1. A multi-power multi-dosage accelerator, comprising:
an electron gun configured to provide a first voltage of the electron gun, a second voltage of the electron gun and a third voltage of the electron gun; and
an accelerating tube configured to generate a first X-ray having a first dosage and first power according to the first voltage of the electron gun, generate a second X-ray having a second dosage and second power according to the second voltage of the electron gun, and generate a third X-ray having a third dosage and third power according to the third voltage of the electron gun, wherein the first dosage is a dosage which can be accepted by human bodies and is much less than the second dosage, the first dosage is much less than the third dosage, and the second power is different from the third power,
the multi-power multi-dosage accelerator is configured to use the first X-ray for inspecting a first area where a person is located, use the second X-ray for inspecting a second area where goods are located, and use the second X-ray and the third X-ray alternatively for inspecting the second area where the goods are located.

2. The multi-power multi-dosage accelerator according to claim 1, wherein the first voltage of the electron gun is lower than the second voltage of the electron gun and the third voltage of the electron gun, and the first power is higher than the second power and the third power.

3. The multi-power multi-dosage accelerator according to claim 1, wherein the first voltage of the electron gun is higher than the second voltage of the electron gun and the third voltage of the electron gun, and the first power is lower than the second power and the third power.

4. The multi-power multi-dosage accelerator according to claim 1, wherein the accelerating tube is a standing wave accelerating tube.

5. A method for inspecting different areas using a multi-power multi-dosage accelerator comprising an electron gun, and an accelerating tube, the method comprising:
providing, by the electron gun, a first voltage of the electron gain, a second voltage of the electron gun and a third voltage of the electron gun;
generating, by the accelerating tube, a first X-ray having a first dosage and first power according to the first voltage of the electron gun, generating a second X-ray having a second dosage and second power according to the second voltage of the electron gun and generating a third X-ray having a third dosage and third power according to the third voltage of the electron gun, wherein the first dosage is a dosage which can be accepted by human bodies and is much less than the second dosage, the first, dosage is much less than the third dosage, and the second power is different from the third power;
inspecting a first area where a person is located using the first X-ray,
inspecting a second area where goods are located using the second X-ray; and
inspecting the second area where the goods are located alternatively using the second X-ray and the third X-ray.

6. The method according to claim 4, wherein the first voltage of the electron gun is lower than the second voltage of the electron gun and the third voltage of the electron gun, and the first power is higher than the second power and the third power.

7. The method according to claim 4, wherein the first voltage of the electron gun is higher than the second voltage of the electron gun and the third voltage of the electron gun, and the first power is lower than the second power and the third power.

8. The method according to claim 4, wherein the accelerating tube is a standing wave accelerating tube.

9. A ray detection system, comprising:
a multi-power multi-dosage accelerator, including:
an electron gun configured to provide a first voltage of the electron gun, a second voltage of the electron gun and a third voltage of the electron gun, and
an accelerating tube configured to generate a first X-ray having a first dosage and first power according to the first voltage of the electron gun, generate a second X-ray having a second dosage and second power according to the second voltage of the electron gun and generate a third X-ray having a third dosage and third power according to the third voltage of the electron gun, wherein the first dosage is a dosage which can be accepted by human bodies and is much less than the second dosage, the first dosage is much less than the third dosage, and the second power is different from the third power, the first X-ray is used for inspecting a first area where a person is located, the second X-ray is used for inspecting a second area where goods are located, and the second X-ray and the third X-ray are used alternatively for inspecting the second area where the goods are located;
a detector configured to receive an X-ray emitted from the accelerator and transmitted through or scattered by a object to be inspected and convert the X-ray into an output signal; and
a data acquisition and imaging module configured to receive the output signal from the detector, obtain partial scanned images of the first area and the second area of the object according to the output signal, and combine the obtained partial scanned images into a complete scanned image of the object.

10. The ray detection system according to claim 7, wherein the first voltage of the electron gun is lower than the second voltage of the electron gun and the third voltage of the electron gun, and the first power is higher than the second power and the third power.

11. The ray detection system according to claim 7, wherein the first voltage of the electron gun is higher than the second voltage of the electron gun and the third voltage of the electron gun, and the first power is lower than the second power and the third power.

12. The ray detection system according to claim 7, wherein the accelerating tube is a standing wave accelerating tube.

* * * * *